(12) United States Patent
Iizuka

(10) Patent No.: US 7,827,235 B2
(45) Date of Patent: Nov. 2, 2010

(54) SERVICE PROVIDING SYSTEM, SERVICE PROVIDING METHOD, AND PROGRAM OF THE SAME

(75) Inventor: Hiroko Iizuka, Hachiouji (JP)

(73) Assignee: Canon Kabushiki Kaisha, Tokyo (JP)

( * ) Notice: Subject to any disclaimer, the term of this patent is extended or adjusted under 35 U.S.C. 154(b) by 1176 days.

(21) Appl. No.: 11/146,839

(22) Filed: Jun. 7, 2005

(65) Prior Publication Data

US 2006/0031530 A1   Feb. 9, 2006

(30) Foreign Application Priority Data

Jun. 8, 2004   (JP)   ............................ 2004-170230

(51) Int. Cl.
G06F 15/16   (2006.01)
(52) U.S. Cl. ..................................... 709/203
(58) Field of Classification Search ................ 709/202, 709/203, 206
See application file for complete search history.

(56) References Cited

U.S. PATENT DOCUMENTS

| 6,308,273 | B1 * | 10/2001 | Goertzel et al. ................. 726/9 |
| 6,385,728 | B1 | 5/2002 | DeBry |
| 6,807,166 | B1 * | 10/2004 | Ohura ......................... 370/352 |
| 7,328,280 | B2 * | 2/2008 | Takeda et al. ............... 709/245 |
| 2002/0161897 | A1 * | 10/2002 | Yamamoto ................. 709/227 |
| 2003/0018710 | A1 * | 1/2003 | Choi ........................... 709/203 |
| 2003/0069991 | A1 * | 4/2003 | Brescia ....................... 709/245 |
| 2003/0140104 | A1 * | 7/2003 | Watanabe et al. ........... 709/206 |
| 2004/0132473 | A1 * | 7/2004 | Mir et al. .................... 455/517 |
| 2004/0139225 | A1 * | 7/2004 | Takahashi ................... 709/238 |
| 2004/0177171 | A1 * | 9/2004 | Ozaki et al. .................... 710/5 |
| 2005/0066055 | A1 * | 3/2005 | Park et al. ................... 709/245 |
| 2005/0086313 | A1 * | 4/2005 | Lucas et al. ................. 709/206 |
| 2005/0138179 | A1 * | 6/2005 | Encarnacion et al. ....... 709/227 |
| 2005/0193075 | A1 * | 9/2005 | Haff et al. ................... 709/206 |
| 2005/0267935 | A1 * | 12/2005 | Gandhi et al. ............... 709/203 |
| 2008/0133774 | A1 * | 6/2008 | Rhee ........................... 709/246 |
| 2008/0147815 | A1 * | 6/2008 | Damm et al. ................ 709/206 |
| 2008/0147816 | A1 * | 6/2008 | Damm et al. ............... 709/206 |
| 2008/0301231 | A1 * | 12/2008 | Mehta et al. ................ 709/204 |

FOREIGN PATENT DOCUMENTS

WO   02-103547   12/2002

* cited by examiner

*Primary Examiner*—Rupal D Dharia
*Assistant Examiner*—Loi Tran
(74) *Attorney, Agent, or Firm*—Canon U.S.A., Inc. I.P. Division

(57) ABSTRACT

A method for controlling a service providing device includes the steps of determining whether the service providing device has already acquired a global address of a client station accessing the service providing device, requesting the client station to notify the global address of the client station when the determining step determines that the service providing device has not yet acquired the global address, and providing the client station with different services based on whether or not the client station notifies the service providing device of the global address in response to the request at the requesting step.

13 Claims, 6 Drawing Sheets

- Addressing · · · · 1
- Discovery · · · · 2
- Description · · · · 3
- Control · · · · 4
- Eventing · · · · 5
- Presentation · · · · 6

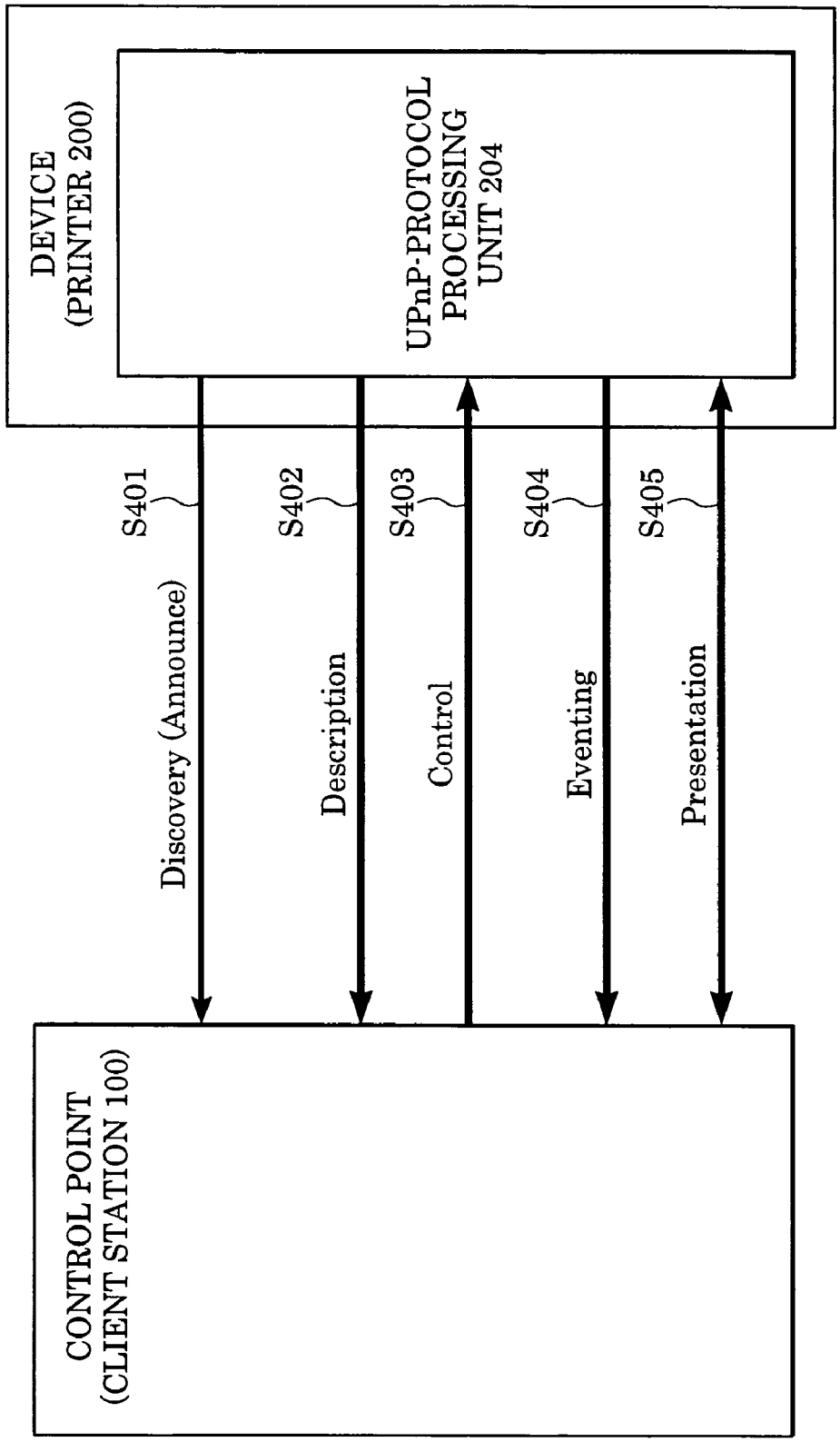

FIG. 5

XML:
- version
- URLBase
- Device
  - Type, Manufacturer, URL
  - Model, URL
  - Serial number
  - Unique Device Name (UDN), Universal Product Code
  - iconList
  - ServiceList
    - Service
      - type, ID
      - URL to service description
      - URL for control
      - URL for eventing
- Device List
- URL for Presentation

FIG. 6

XML:
- version
- action list
  - action
    - action name
    - argument
      - parameter name, state variable name
  - service state variable
    - state variable
      - name, type, default value
      - allowed value list
        - enumerated value
      or
      - allowed value range
        - maximum and minimum value

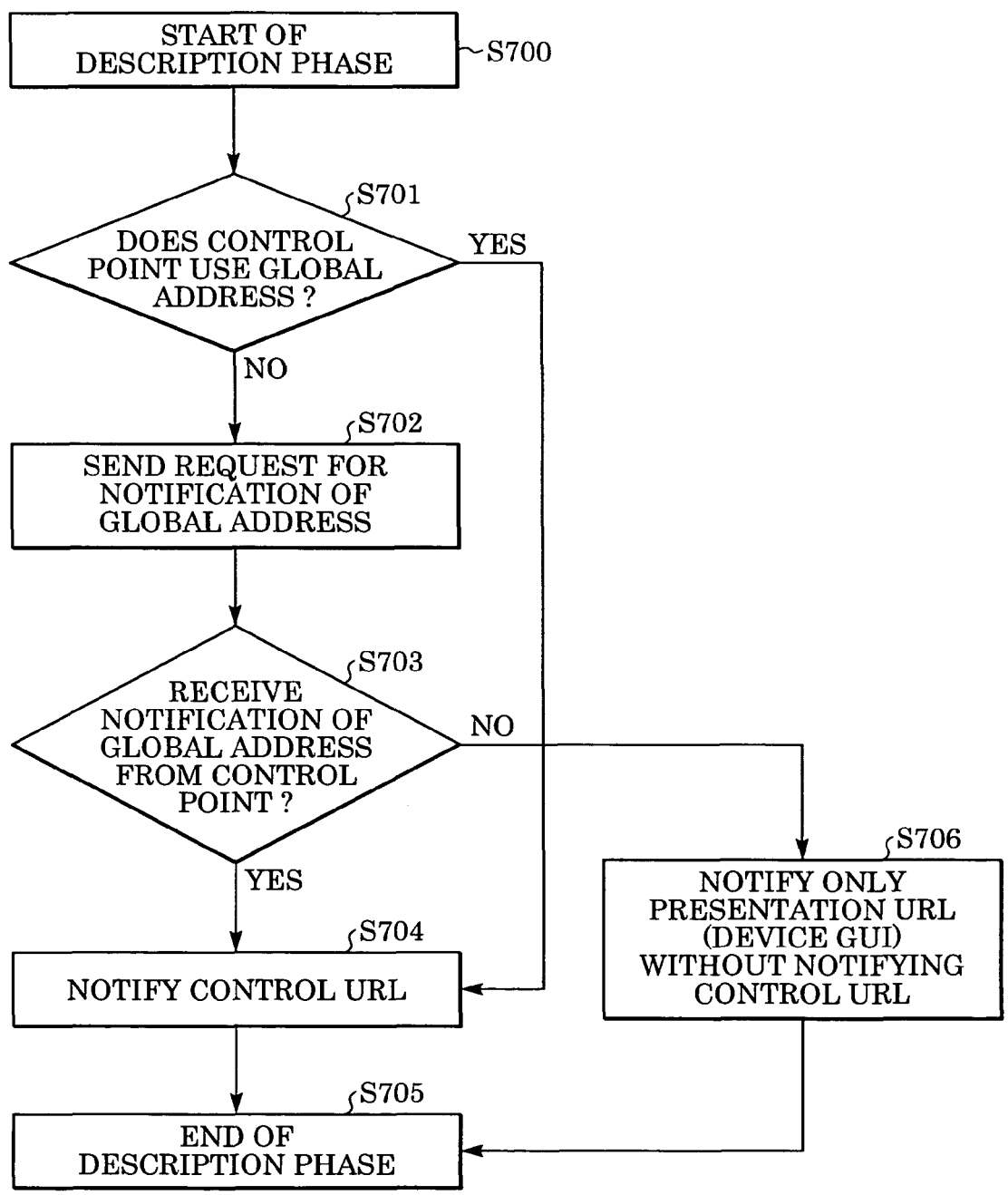

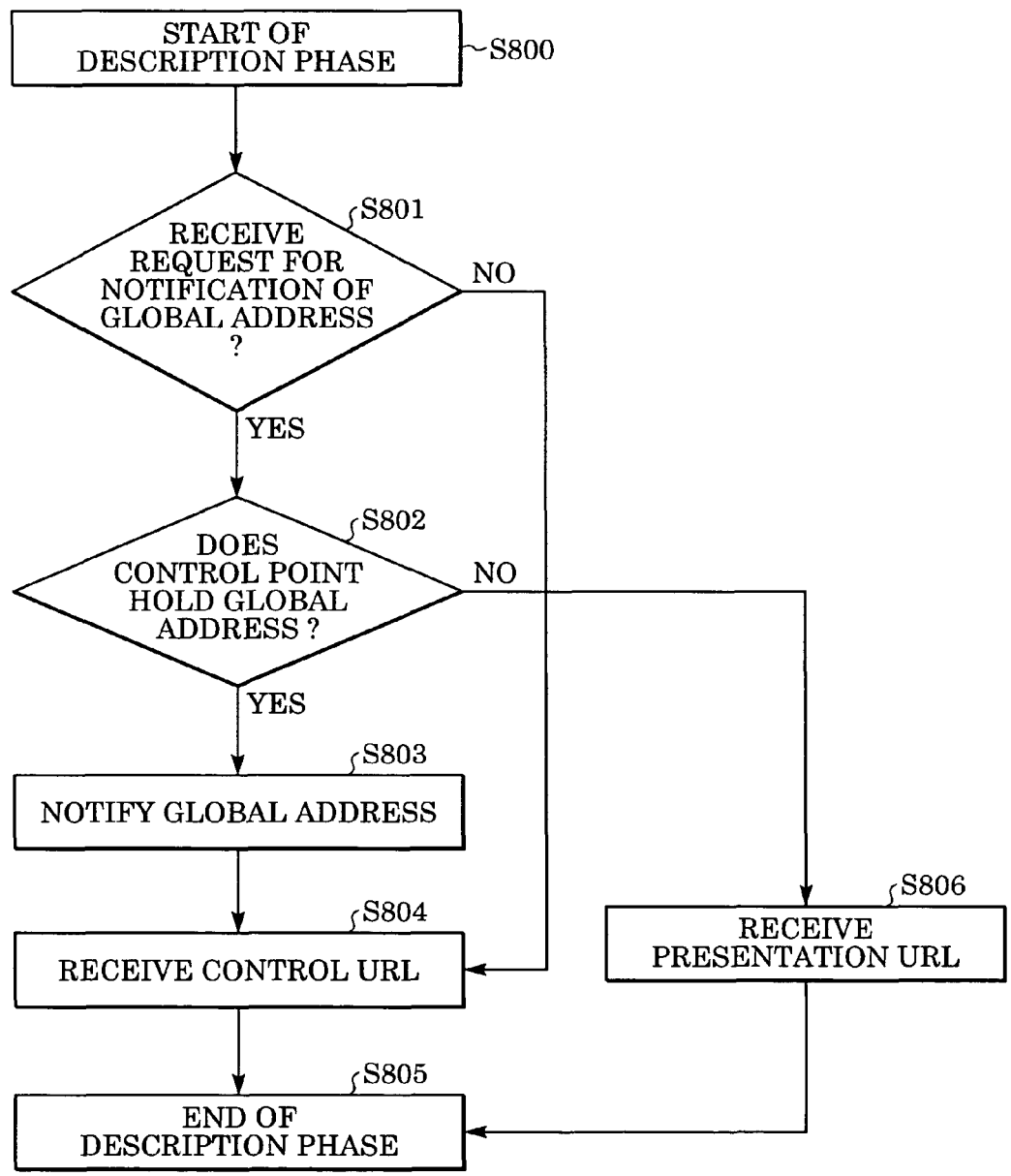

SERVICE PROVIDING SYSTEM, SERVICE PROVIDING METHOD, AND PROGRAM OF THE SAME

BACKGROUND OF THE INVENTION

1. Field of the Invention

The present invention relates to a service providing device, a client station, a service providing system including these device and station, and a service providing method, all of which provide a predetermined service over a communication medium.

2. Description of the Related Art

Recently, a protocol called Universal Plug and Play (UPnP, trade mark) has been developed to allow personal computers, peripherals thereof, and consumer electronics products at home to communicate with each other.

On the other hand, service providing devices that accept a request for a service from a client station and provide the service to the client station have been known. Also, in accordance with the widespread use of communication by the Internet, a variety of networked devices has been developed in addition to personal computers. For example, user interactive devices including personal digital assistants (PDAs) and cell phones, image processing apparatuses including scanners, printers, copiers, and digital cameras, and even consumer electronics products including TV sets, air conditioners, and refrigerators, have been rapidly networked.

In accordance with this situation, in order to improve usability and operability of the networked devices, a variety of protocols has been proposed to provide an automatic network address setting unit, a searching unit for searching for networked devices providing a service, and an automatic setup unit of application software, utility software, and operating systems for controlling the network devices. Examples of such protocols include the above-described UPnP (trade mark), the development of which Microsoft Corporation primarily fosters, BMLinks which the Japan Business Machine and Information System Industries Association (JBMIA) has developed, and Renedzvous supported in OS X, which Apple Computer, Inc. has developed.

However, in the current messaging specification of UPnP (trade mark), a device notifies all control points that send a request to the device of the URL for receiving information (hereinafter, the URL is referred to as a control URL). In such a specification, the device notifies all the control points of the control URL without access limitations. Since the control URL allows a malicious third party to access a control server and to access device commands, there is a possibility of the device being subjected to Denial-of-Service (DoS) attacks by the third party. That is, if the device notifies an unauthorized station of the control URL, the unauthorized station can easily connect to the networked device, thus causing a security problem.

SUMMARY OF THE INVENTION

The present invention is directed to a service providing system, a service providing method, and a program thereof for improving the security level in network communication.

According to an aspect of the present invention, a method for controlling a service providing device includes the steps of determining whether the service providing device has already acquired a global address of a client station accessing the service providing device, requesting the client station to notify the global address of the client station when the determining step determines that the service providing device has not yet acquired the global address, and providing the client station with different services based on whether or not the client station notifies the service providing device of the global address in response to the request at the requesting step.

Other features and advantageous of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a data flow diagram between a control point and a device in the second to sixth phases among the first to sixth phases shown in FIG. 3.

FIG. 5 shows an example of first description data describing information on the printer 200 according to the embodiment.

FIG. 6 shows an example of second description data describing information on a service provided by the printer according to the embodiment.

FIG. 7 is a flow chart illustrating the detailed process of the printer at step S402 in FIG. 4.

FIG. 8 is a flow chart illustrating the detailed process of the client station at step S402 in FIG. 4.

DESCRIPTION OF THE EMBODIMENTS

Embodiments of the present invention will be described below in detail with reference to the accompanying drawings.

Figure 1:
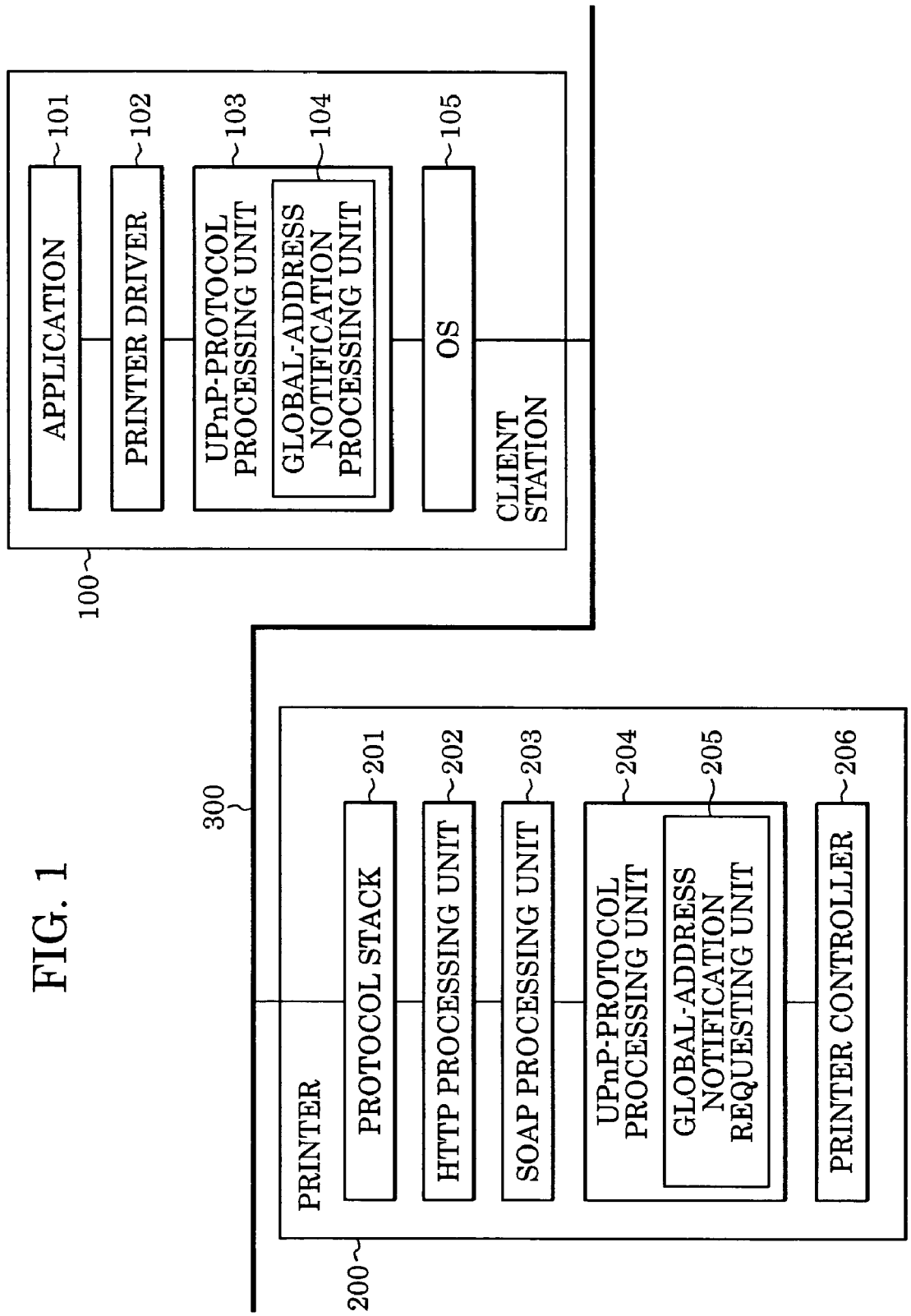
FIG. 1 is a block diagram of a protocol control system according to an embodiment of the present invention.

A protocol control system, which controls a communication protocol in a network according to the embodiment, will be described as an example. First, the protocol control system used in a service providing system which provides a print service via a network will be described. FIG. 1 is a block diagram of a protocol control system (service providing system) according to an embodiment of the present invention. Examples of service providing devices include a printer 200, a facsimile, a scanner, a digital camera, a cell phone, a copier, and a multi-function apparatus integrating these devices (not shown).

As shown in FIG. 1, a client station 100 is connected to a printer (service providing device) 200 via a network 300. Also, as shown in FIG. 1, the client station 100 includes a general purpose operating system (OS) 105, such as Windows® from Microsoft Corporation and Mac OS® from Apple Computer, Inc. Furthermore, the client station 100 includes an application 101, which is a general purpose application capable of running on the OS 105.

A UPnP (trade mark) protocol processing unit 103 of the client station 100 allows the client station 100 to discover a device on the network 300, to control the device, and to acquire the state of the device by using the UPnP protocol based on XML (extensible Markup Language) and SOAP (Simple Object Access Protocol). For example, when the application 101 is a word processor, a document created by the application 101 is converted to printable data by a printer driver 102 and is submitted to a printer as a print job by the UPnP protocol processing unit 103. The printer (for example, the printer 200), which supports the UPnP protocol, is connected to the network 300 and is discovered by the UPnP protocol processing unit 103.

On the other hand, the printer 200 is a networked device capable of being connected to the network 300. The printer 200 includes a protocol stack 201 for stacking protocols for TCP (transmission control protocol), UDP (user datagram protocol), and IPv6 (Internet Protocol version 6). The printer 200 also functions as a service providing device for providing a print service via the network 300. The printer 200 also includes an HTTP processing unit 202 as a higher layer of the protocol stack 201. The HTTP processing unit 202 analyzes an HTTP request and carries out its response process. The printer 200 also includes a SOAP processing unit 203 for processing SOAP and a UPnP protocol processing unit 204 for processing the UPnP protocol as higher layers of the HTTP processing unit 202.

Furthermore, the printer 200 implements the PrintBasic service established by the UPnP forum. The UPnP protocol processing unit 204 has a function to analyze a print job and attribute information defined by the service and to submit a print request to a printer controller 206.

Figures 2, 3:
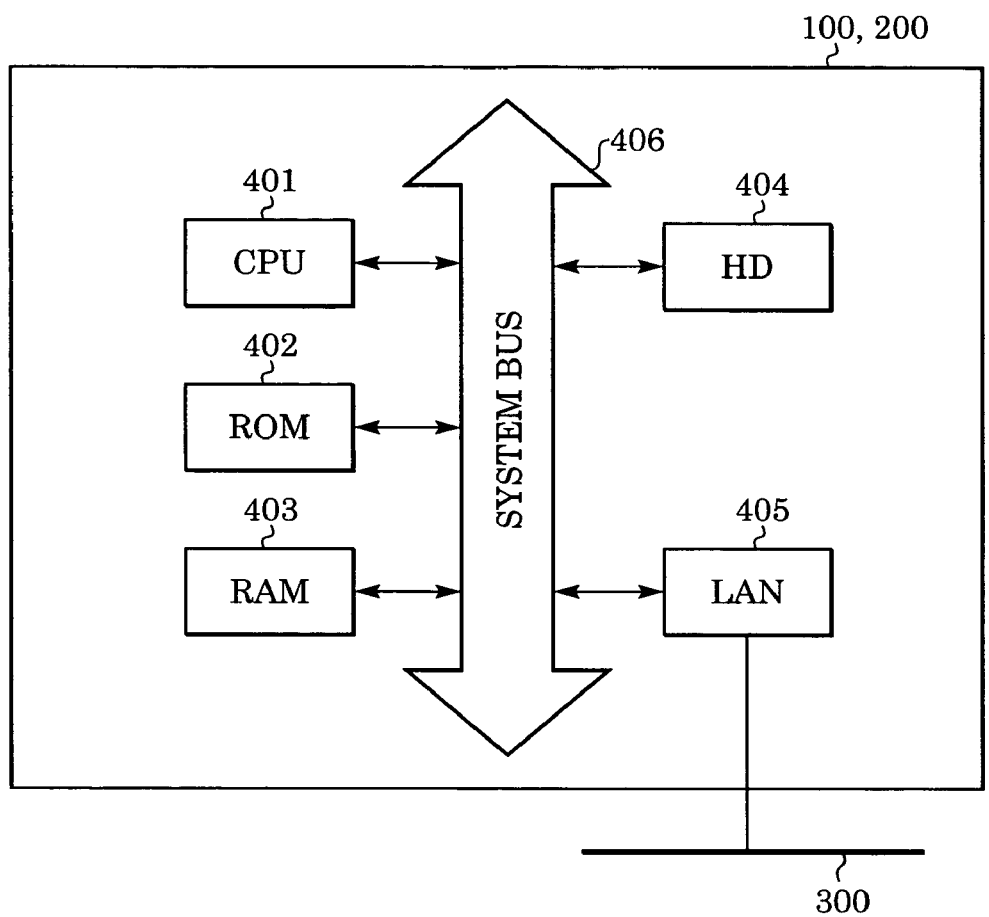
FIG. 2 shows a hardware configuration realizing a function of a client station 100 or a printer 200 shown in FIG. 1.
FIG. 3 shows first to sixth phases of UPnP (trade mark).

FIG. 2 shows a hardware configuration realizing a function of the client station 100 or the printer 200 shown in FIG. 1. As shown in FIG. 2, the client station 100 or the printer 200 includes a central processing unit (CPU) 401 executing software (a program) stored in a read only memory (ROM) 402 or a hard disk (HD) 404. The CPU 401 performs overall control of each device connected to a system bus 406 by executing the software.

A random access memory (RAM) 403 functions as a main memory and a work area of the CPU 401. A LAN card 405 executes bi-directional data communication between the client station 100 (or the printer 200) and another networked device (or another network station) via the network 300, which is a local area network (LAN).

The specification of UPnP (trade mark) will be briefly described next. As shown in FIG. 3, UPnP has six phases. FIG. 3 shows these six phases of UPnP (trade mark). As used herein, the term "control point" refers to a client belonging to a UPnP (trade mark) network, namely, the client station 100 in this embodiment. Also, the term "device" refers to a device providing one service or a plurality of services to a UPNP (trade mark) network, namely, the printer 200 in this embodiment.

As shown in FIG. 3, in the first phase, namely, the Addressing phase, a device (the printer 200) automatically generates a link-local address and acquires this address. Then, in the second phase, namely, the Discovery phase (detection phase), the device (the printer 200) announces a service in accordance with the simple service discovery protocol (SSDP). Thus, a control point (the client station 100) can discover the device (the printer 200).

In the third phase, namely, in the Description phase, the control point (the client station 100) acquires a Description of the device (the printer 200) (refer to FIG. 5 described below) and a Description of the service (refer to FIG. 6 described below). As used herein, Description is a set of information items required for controlling the device. More specifically, Description includes a Presentation URL (a GUI of a device), a Control URL (the entry point to a control server and the entry point to a device command), an Event Subscription URL (event service registration of a device), and a Service Control Protocol (SCP) Description (a language used for a device).

In the fourth phase, namely, in the Control phase, the control point (the client station 100) sends a control message to the Control URL of the service. The control message is sent over SOAP/HTTP protocol. Thereafter, in the fifth phase, namely, the Eventing phase, the destination of events sends an accept message (a subscription message) to the source of the events, which then sends a notification of the state change to the destination of the events, namely, the control point (the client station 100) in response to the change in the service state.

In the sixth phase, namely, in the Presentation phase, the control point (the client station 100) acquires a page (a GUI of the device) from the Presentation URL and delivers the acquired page to a browser so that a user can control the device via the browser. By processing the above-described first to sixth phases, the client station 100 can acquire information about the printer 200 in the UPnP (trade mark) network 300 to utilize a service provided by the printer 200.

FIG. 4 is a data flow diagram between the control point (the client station 100) and the device (the printer 200) in the second to sixth phases among the first to sixth phases shown in FIG. 3. As shown in FIG. 4, at step S401, the device (the printer 200) first announces a service to the control point (the client station 100) as a process in the Discovery phase.

At step S402, as a process in the Description phase, the control point (the client station 100) then acquires the Description of the device (the printer 200) (hereinafter referred to as "first description data"), as shown in FIG. 5, and the Description of the service (hereinafter referred to as "second description data"), as shown in FIG. 6. FIG. 5 shows an example of first description data describing information on the printer 200 according to this embodiment. FIG. 6 shows an example of second description data describing information on a service provided by the printer 200 according to this embodiment.

In this embodiment, the control point (the client station 100), at step S402, carries out a process characteristic of the embodiment when acquiring the first description data on the device (the printer 200) and the second description data on the service (a print service) from the device (the printer 200). The details of the characteristic process will be described below with reference to FIGS. 7 and 8. First, the characteristic process will be schematically described next.

According to the embodiment, the client station 100 may have two addresses: a link-local address, which is assigned by UPnP, and a global address, which is uniquely assigned in the Internet world. Here, the link-local address is always assigned to an information technology (IT) product implementing UPnP in the Addressing phase of UPNP. The link-local address is considered as a low-trust address, that is, a nonuniversal address. On the other hand, the global address is considered as a high-trust address, that is, a universal address which is uniquely assigned on the Internet.

Accordingly, by determining whether an access from the client station 100 to the printer 200 is using a link-local address or a global address, the printer 200 can change the control range permitted to the client station 100 so as to increase the security level. Thus, in communication among PCs, peripherals thereof, and consumer electronics products at home using a protocol that allows communication (e.g., UPnP (trade mark) protocol), the security level can be increased compared to known communication methods.

At step S403, as a process in the Control phase, the control point (the client station 100) reads the second description data and sends a control message to the Control URL of the service. At step S404, as a process in the Eventing phase, the device (the printer 200), which is the source of an event, then sends a notification of the change in a service state to the control point (the client station 100) in accordance with the change.

At step S405, as a process in the Presentation phase, the device (the printer 200) sends page information for a browser (a GUI of the device) to the control point (the client station 100). Thus, the control point (the client station 100) can deliver the acquired page to the browser so as to allow a user to control the device (the printer 200) via the browser.

A process in step S402 in FIG. 4 (a process in the description phase), which is the characteristic process of this embodiment, will be described below in detail. First, the process of the printer 200 in step S402 will be described in detail next with reference to FIG. 4. FIG. 7 is a flow chart illustrating the detailed process of the printer 200 at step S402 in FIG. 4.

As shown in FIG. 7, the printer 200 starts processing by executing a program for a process at step S402 (i.e., a process in the Description phase) (step S700). At step S701, the printer 200 determines whether the client station 100 sends a SSDP request using a link-local address access or a global address access. If the printer 200 determines that the client station 100 uses a link-local address access (No at step S701), the process proceeds to step S702, where a global address notification requesting unit 205 of the UPNP protocol processing unit 204 in the printer 200 requests the notification of the global address to the client station 100. Thereafter, at step S703, the printer 200 determines whether or not the client station 100 returns the global address in response to the request at step S702.

If the printer 200 determines that the client station 100 returns the global address (Yes at step S703), the process proceeds to step S704, where the printer 200 sends the control URL of the printer 200 to the client station 100. The process then proceeds to step S705, where the Description phase is completed. However, if the printer 200 determines that the client station 100 uses a global address access (Yes at step S701), the process of the printer 200 proceeds to step S704. If, at step S703, the printer 200 determines that the client station 100 does not return the global address (No at step S703), the process proceeds to step S706, where the printer 200 notifies only the presentation URL without notifying the control URL. The process then proceeds to step S705.

The process of the client station 100 at step S402 will be described in detail next. FIG. 8 is a flow chart illustrating the detailed process of the client station 100 at step S402 in FIG. 4. Link-local addresses are described as "fe80:0000:0000: 0000<Interface ID>" (base 16 number), on the other hand, global addresses begin with "001" (2 bit format). The details are described in RFC2374 (http://www.ietf.org/rfc/rfc2374.txt). In this embodiment of step S701 or the other steps of FIG. 7, by extracting addresses which are included in packets received from a source and checking extracted packet bits, a program can determines whether the source notifies a link local address or a global address.

As shown in FIG. 8, the client station 100 starts processing by executing a program for a process at step S402 (i.e., a process in the Description phase) (step S800). At step S801, the client station 100 first waits for a request for the notification of the global address from the printer 200. As described above, the request for the notification of the global address is sent from the process at step S702 in FIG. 7.

If the client station 100 receives the request for the notification of the global address from the printer 200 (Yes at step S801), the process proceeds to step S802, where a global address notification processing unit 104 in the UPnP protocol processing unit 103 of the client station 100 determines whether the client station 100 has a global address.

If it is determined that the client station 100 has a global address (Yes at step S802), the process proceeds to step S803, where the UPnP protocol processing unit 103 sends a notification of the global address to the printer 200. The process then proceeds to step S804. At step S804, the client station 100 receives a control URL from the printer 200. The process then proceeds to step S805. At step S805, the client station 100 terminates the process of the Description phase.

However, if, at step S801, the client station 100 does not receive a request for the notification of the global address from the printer 200 (No at step S801), the process of the client station 100 proceeds to step S804. If, at step S802, it is determined that the client station 100 has no global address, the process proceeds to step S806, where the client station 100 receives the presentation URL from the printer 200, and then the process proceeds to step S805. As described above, the presentation URL received at step S806 is the presentation URL that the printer 200 sends to the client station 100 at step S706 in FIG. 7.

By carrying out the process of the Description phase, as shown in FIGS. 7 and 8, the printer 200 sends a notification of the control URL, which permits high level or detailed level control of the printer 200, to the client station 100 that accesses the printer 200 using a global address. In contrast, when the client station 100 accesses the printer 200 without sending a notification of a global address (i.e., by using a link-local address), the printer 200 notifies the client station 100 of the presentation URL, which limits the access of the printer 200 to a predetermined range. That is, the client station 100 that notifies the printer 200 of the global address and accesses the printer 200 can carry out higher or more precise level control of the printer 200. Thus, since the control level of the printer 200 can be limited for the client station 100 that notifies the printer 200 of only the low-trust link-local address, the security level can be increased.

Furthermore, in a higher conceptual level, a device (the printer 200) connected to a network determines whether, in the Description phase of UPnP (trade mark), the access from a control point (the client station 100) is an access using a link-local address or an access using a global address. If it is determined that the access is an access using a link-local address, the device requests the control point to notify the device of the global address. If the control point (the client station 100) notifies the device of the global address, the device notifies the control point of the control URL, which allows entire control of the device. However, if the control point does not notify the device of the global address, the device does not notify the control point of the control URL, but notifies only the presentation URL, which is a GUI of the device and which permits only a limited access to the device. Thus, by distinguishing IT products that have only a low-trust (nonuniversal) link-local address from IT products that have a high-trust (universal) global address, the security level of UPnP (trade mark) can be increased.

Additionally, according to another embodiment, the case where UPnP and IPv6 coexist in the same network will be described next. This case is anticipated when considering the widespread use of IPv6 in the future. When UPnP and IPv6 coexist in the same network, some IT products have both a link-local address, which is assigned by UPNP and IPv6, and a global address. In terms of the link-local address, a link-local address is always assigned to an IT product that implements UPnP in the Addressing phase of UPnP. Therefore, the address is low-trust (nonuniversal). An IT product that implements IPv6 always generates a link-local address automatically. Therefore, the address of the IT product is also low-trust (nonuniversal). The present invention can be also applied to such a case.

The processes shown in FIGS. 4, 7, and 8 in the above-described embodiments are achieved by the CPU 401 executing programs for the processes read from a memory. However, the present invention is not limited thereto. Alternatively, some of or all of the processes may be achieved by dedicated hardware. Also, the above-described memory may be a computer-readable and computer-writable recording medium including a nonvolatile memory, such as a magneto optical disk unit and a flash memory, a read-only memory, such as a CD-ROM (compact disk—read-only memory), a volatile memory in addition to a RAM, or a combination thereof.

The functions described in relation to FIGS. 4, 7, and 8 may be achieved by recording programs that execute these functions in a computer-readable recording medium and by a computer system reading out the programs from the recording medium and executing the programs. As used herein, the term "computer system" refers to an operating system (OS) and hardware including peripherals. More specifically, the functions of the above-described embodiments may be achieved by a process in which, after a program read from a recording medium is stored in a memory of an add-on expansion board inserted in a computer or a memory of an add-on expansion unit connected to a computer, a CPU in the add-on expansion board or in the add-on expansion unit executes some of or all functions described in the above-described embodiments.

In addition, the term "computer-readable recording medium" refers to a removable medium, such as a flexible disk, a magneto optical disk, a ROM, a CD-ROM (compact disk—read-only memory), and a storage unit installed in a computer system, such as a hard disk. Furthermore, the term "computer-readable recording medium" includes a memory which holds a program for a predetermined time period, like a volatile memory (RAM) installed in a computer system which functions as a server or a client when the program is transferred via a network, such as the Internet, and a communication line, such as a telephone line.

Furthermore, the program may be transferred from a computer system storing the program in a storage unit to another computer system via a transmission medium or transmitted waves in a transmission medium. As used herein, the term "transmission medium" refers to a medium capable of transmitting information including a network (communication network), such as the Internet, and a communication line (communication wire), such as a telephone line.

The program may be used for achieving some of the above-described functions. In addition, the program may be a program that achieves the above-described functions along with programs pre-stored in a computer system, that is, the program may be a file known as a difference file (a difference program).

Furthermore, the present invention can be applied to a program product including a computer-readable recording medium for recording the program as an embodiment of the present invention. The above-described program, recording medium, transmission medium, and program product are included within the spirit and scope of the present invention.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-170230 filed Jun. 8, 2004, which is hereby incorporated by reference herein.

What is claimed is:

1. A service providing system comprising:
a client station and a service providing device;
the service providing device being configured to provide a service to the client station; and
the client station being configured to use one of a link-local address and a global address for accessing the service of the service providing device, wherein the service providing device includes:
 a determination unit configured to determine whether the client station uses the link-local address or the global address for accessing the service of the service providing device;
 a service providing unit configured to provide the client station with a first URL address of a page where entire control of the service providing device is possible when the determination unit determines that the client station uses the global address for accessing the service of the service providing device; and
 a notification requesting unit configured to request the client station to notify the service providing device of the global address of the client station when the determination unit determines that the client station uses the link-local address for accessing the service of the service providing device;
 wherein the service providing unit provides the client station (1) with the first URL address when the client station, in response to the request from the notification requesting unit, notifies the service providing device of the global address, and (2) with a second URL address of a page where a partial control of the service providing device is possible when the client station, in response to a request from the notification requesting unit, notifies the service providing device of the link-local address despite the request for the global address.

2. The service providing system according to claim 1, wherein the client station and the service providing device communicate with each other with a communication protocol including a UPnP (Universal Plug and Play) protocol.

3. The service providing system according to claim 1, wherein processes carried out by the determination unit, the notification requesting unit, and the service providing unit of the service providing device and processes carried out by the client station are processes carried out in a description phase of a UPnP protocol.

4. A service providing method in a service providing system including a client station and a service providing device, the service providing device configured to provide a service to the client station and the client station configured to use one of a link-local address and a global address for accessing the service of the service providing device, the method comprising the steps of:
determining, by the service providing device, whether the client station uses the link-local address or the global address for accessing the service of the service providing device;
providing the client station with a first URL address of a page where entire control of the service providing device is possible when the determining step determines that the client station uses the global address for accessing the service of the service providing device; and
requesting, by the service providing device, the client station to notify the service providing device of the global address of the client station if it is determined in the determining step that the client station uses the link-local address to access the service of the service providing device address;

wherein the providing step includes providing from the service providing device to the client station (1) with the first URL address when the client station, in response to the request in the requesting step, notifies the service providing device of the global address, and (2) with a second URL address of a page where a partial control of the service providing device is possible when the client station, in response to the request in the requesting step, notifies the service providing device of the link-local address in spite of the request for the global address.

5. The service providing method according to claim 4, wherein a communication protocol between the client station and the service providing device is a UPnP (Universal Plug and Play) protocol.

6. A service providing device for providing a service to a client station that holds at least one of a link-local address and a global address, the service providing device comprising:

a determination unit configured to determine whether the service providing device acquires the link-local address or the global address of the client station accessing the service providing device;

a service providing unit configured to provide the client station with a first URL address of a page where entire control of the service providing device is possible when the determination unit determines that the client station uses the global address for accessing the service of the service providing device; and a notification requesting unit configured to request the client station to notify the service providing device of the global address of the client station if the determination unit determines that the service providing device has acquired the link-local address of the client station;

wherein the service providing unit provides the client station (1) with the first URL address when the client station, in response to the request from the notification requesting unit, notifies the service providing device of the global address, and (2) with a second URL address of a page where a partial control of the service providing device is possible when the client station, in response to the request from the notification requesting unit, notifies the service providing device of a link-local address in spite of the request for the global address.

7. The service providing device according to claim 6, wherein a communication protocol between the client station and the service providing device includes a UPnP (Universal Plug and Play) protocol.

8. The service providing device according to claim 6, wherein processes carried out by the determination unit, the notification requesting unit, and the service providing unit are processes carried out in a description phase of a UPnP protocol.

9. A method for controlling a service providing device for providing a service to a client station that holds at least one of a link-local address and a global address, the method comprising the steps of:

determining whether the service providing device acquires the link-local address or the global address of the client station accessing the service providing device;

providing the client station with a first URL address of a page where entire control of the service providing device is possible when the determining step determines that the client station uses the global address for accessing the service of the service providing device; and requesting the client station to notify the global address of the client station when the determining step determines that the service providing device has acquired the link-local address of the client station; and wherein the providing step includes providing the client station (1) with the first URL address when the client station, in response to the request from the notification requesting unit, notifies the service providing device of the global address, and (2) with a second URL address of a page where a partial control of the service providing device is possible when the client station, in response to the request from the notification requesting unit, notifies the service providing device of a link-local address in spite of the request for the global address.

10. The method for controlling a service providing device according to claim 9, wherein a communication protocol between the client station and the service providing device is a UPnP (Universal Plug and Play) protocol.

11. The method for controlling a service providing device according to claim 9, wherein processes carried out at the determining step, the requesting step, and the providing step are processes carried out in a description phase of a UPnP protocol.

12. A computer-readable storage medium storing a control program for causing a service providing device to provide a service to a client station that holds at least one of a link-local address and a global address, the program including instructions to execute the steps of:

determining whether the service providing device acquires the link-local address or the global address of the client station accessing the service providing device;

providing the client station with a first URL address of a page where entire control of the service providing device is possible when the determining step determines that the client station uses the global address for accessing the service of the service providing device; and requesting the client station to notify the global address of the client station when the determining step determines that the service providing device has acquired the link-local address;

wherein the providing step includes providing the client station (1) with the first URL address when the client station, in response to the request from the notification requesting unit, notifies the service providing device of the global address, and (2) with a second URL address of a page where a partial control of the service providing device is possible when the client station, in response to the request from the notification requesting unit, notifies the service providing device of a link-local address in spite of the request for the global address.

13. A client station capable of accessing a service of a service providing device by using one of a link-local address and a global address, the client station comprising:

a request receiving unit configured to receive, from the service providing device, a request for notifying the service providing device of the global address;

a determining unit configured to determine whether the client station holds the global address, in response to the request receiving unit receiving the request for notifying the service providing device of the global address;

a service receiving unit configured to receive from the service providing device a first URL address of a page where entire control of the service providing device is possible when the determination unit determines that the client station uses the global address for accessing the service of the service providing device, and a notification unit configured to notify the service providing device of the global address when the determining determines that the client station holds the global address, and of the link-local address when the determining unit determines that the client station does not hold the global address;

wherein the service receiving unit receives from the service providing device the first URL address when the client station notifies the service providing device of the global address, and a second URL address of a page where partial control of the service providing device is possible when the client station notifies the service providing device of the link-local address despite the request for the global address.

* * * * *